United States Patent
Johnstone

[11] 4,120,030
[45] Oct. 10, 1978

[54] COMPUTER SOFTWARE SECURITY SYSTEM

[75] Inventor: Richard Johnstone, Brookfield, Wis.

[73] Assignee: Kearney & Trecker Corporation, West Allis, Wis.

[21] Appl. No.: 776,702

[22] Filed: Mar. 11, 1977

[51] Int. Cl.$^2$ .................. G06F 13/06; G06F 7/00; G11C 7/00

[52] U.S. Cl. .................................................. 364/200

[58] Field of Search .............................. 340/146.1 A; 364/200 MS File, 300, 900 MS File; 178/22; 235/61.7 B

[56] References Cited

U.S. PATENT DOCUMENTS

| | | | |
|---|---|---|---|
| 3,662,343 | 5/1972 | Goldstein et al. | 235/61.7 B |
| 3,798,359 | 3/1974 | Feistel | 178/22 |
| 3,798,605 | 3/1974 | Feistel | 178/22 |
| 3,806,882 | 4/1974 | Clarke | 364/200 |
| 3,909,802 | 9/1975 | Cassarino et al. | 364/200 |
| 3,920,894 | 11/1975 | Shirley et al. | 340/146.1 A |
| 3,940,736 | 2/1976 | Inaba et al. | 340/146.1 A |
| 3,943,492 | 3/1976 | Gall | 364/900 |
| 3,958,081 | 5/1976 | Ehrsam et al. | 178/22 |
| 3,962,539 | 6/1976 | Ehrsam et al. | 178/22 |
| 3,978,454 | 8/1976 | Willard | 364/900 |
| 3,992,702 | 11/1976 | Bailey | 364/200 |
| 4,010,451 | 3/1977 | Kibble et al. | 364/200 |
| 4,051,460 | 9/1977 | Yamada et al. | 364/900 |
| 4,056,711 | 11/1977 | Lamar | 364/200 |
| 4,056,809 | 11/1977 | Hoerning et al. | 364/200 |
| 4,064,554 | 12/1977 | Tubbs | 364/200 |
| 4,068,300 | 1/1978 | Bachman | 364/200 |

Primary Examiner—Gareth D. Shaw
Assistant Examiner—Jan E. Rhoads
Attorney, Agent, or Firm—Cyril M. Hajewski

[57] ABSTRACT

The data address portions of a set of computer instructions are scrambled in accordance with a predetermined cipher key before the instructions are loaded into the instruction memory. The instructions with the scrambled data address portions are then loaded into the instruction memory at addresses corresponding to the original program sequence. The data involved in the program is loaded into a separate data memory at the addresses specified in the original unscrambled program. An unscrambler circuit which operates in accordance with the cipher key is coupled in series with the data memory address input conductors and is mounted on the data memory unit and is encapsulated therewith to prevent anyone from examining the unscrambler to determine the cipher key or from electrically interrogating the unscrambler in such a manner as to determine the cipher key. The scrambled data addresses do not interfere with normal computer operations or maintenance procedures but do prevent anyone from reproducing the original unscrambled program with the information available in the instruction and data memories.

9 Claims, 4 Drawing Figures

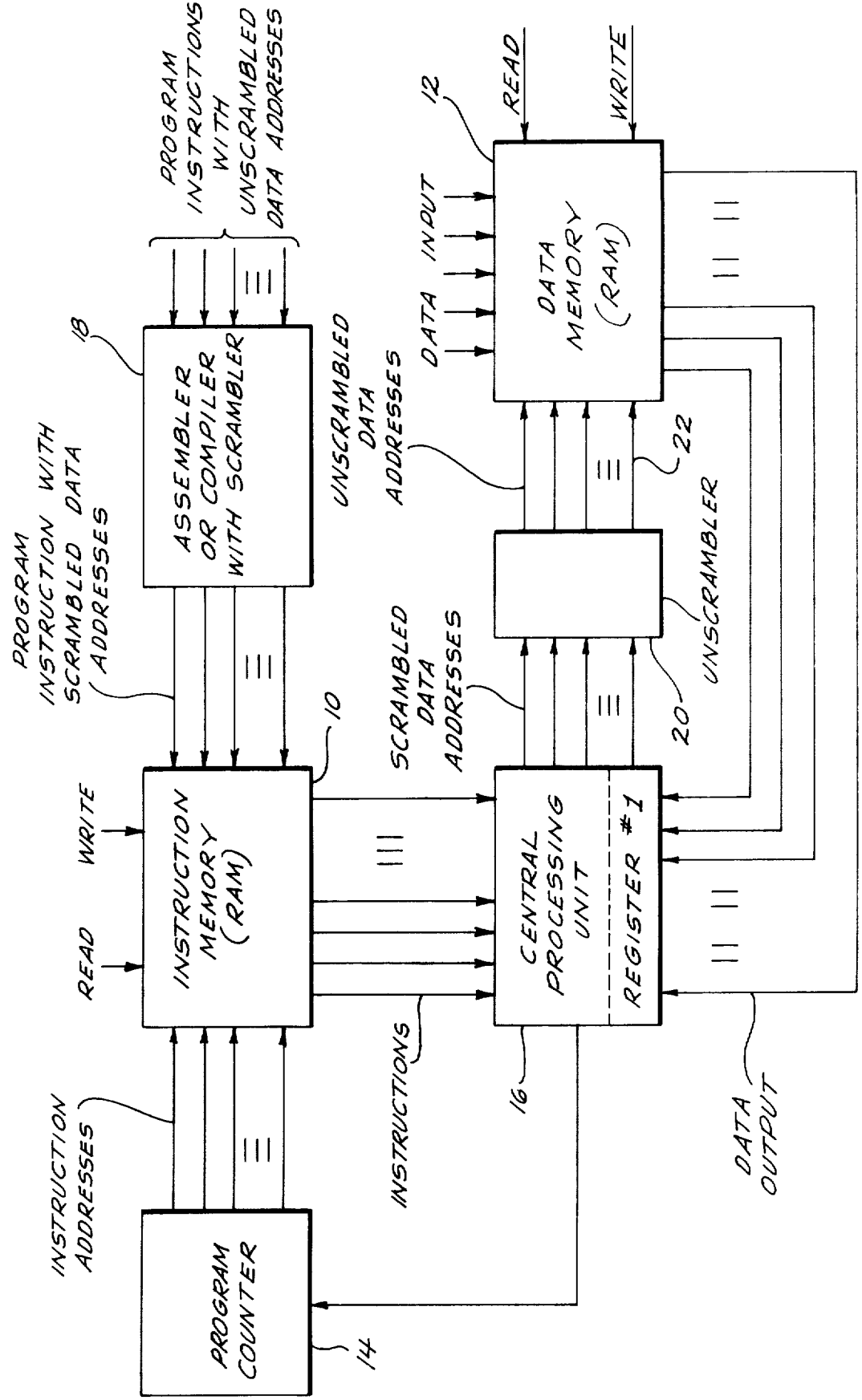

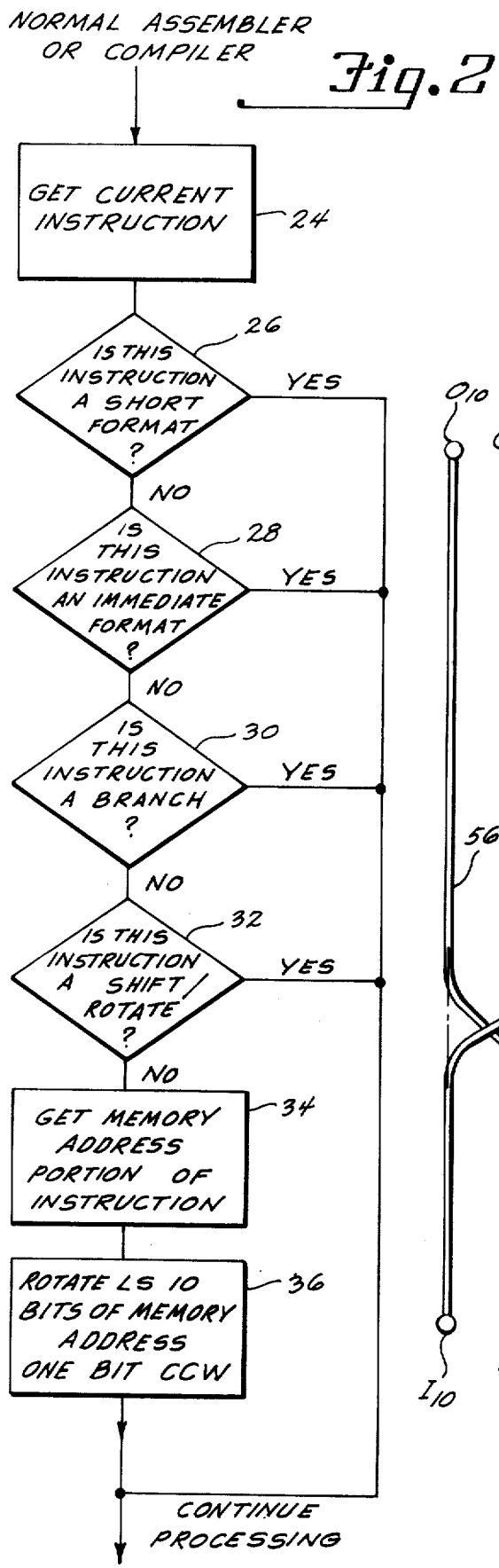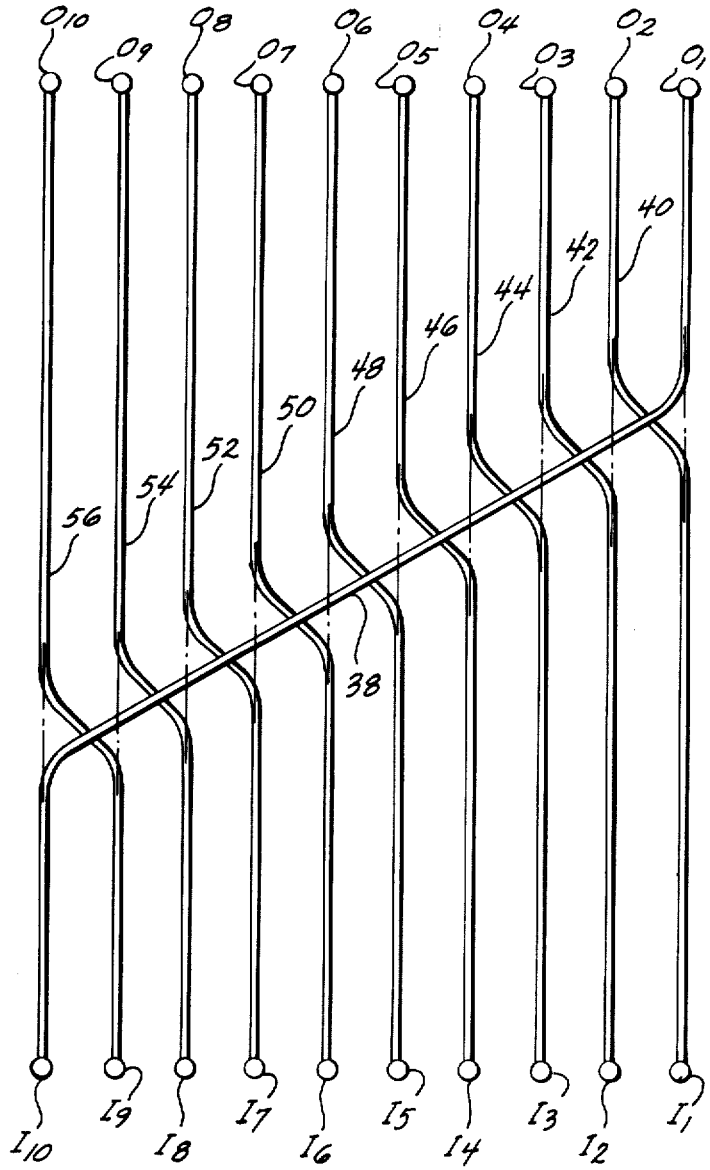

COMPUTER SOFTWARE SECURITY SYSTEM

BACKGROUND OF THE INVENTION

This invention relates to a computer software security system for preventing the user of a computer program from reproducing the program without interfering with normal use of the program in the computer for which it was designed and without interfering with normal maintenance procedures for that computer.

For any given computer function there is a large number of particular programs that can be written to perform that function, and these programs, though they all perform the same ultimate function, may differ greatly in terms of the number of steps employed, the memory capacity required to store the program, the time required to run the program, the compatibility of the program with other programs used on the same computer or in the same data processing system, the adaptibility of the program for other uses and the number of man hours required to write the program. These differences are very important in computer operation and can make a substantial difference in the cost of computer operation since computer time, computer memory capacity, and skilled programming personnel are all relatively expensive.

The cost advantages that a particular program offers to the computer user are usually reflected in the price placed on the program by the program designer, but this price is normally based upon use of the program for its intended computer function and does not compensate the program designer if the program is reproduced and modified by the user for other computer functions. If the price of the program is set high enough to compensate the program designer for all possible modifications of the program, this would be unfair to the users who only use the program for its intended purpose, and also might forfeit any cost advantages of the program in competition with other program designers or even price the program out of the market.

Although the program designer can utilize copyright protection to prevent unauthorized reproduction of his programs, or to claim damages for unauthorized reproduction, no patent protection is available for computer programs per se under the present state of the law to prevent the program user from utilizing the same basic program with modifications for other purposes or from selling such modified programs in competition with the program designer. Accordingly, there exists a need for a computer software security system that will prevent a computer program user from reproducing the program without preventing normal use of the program to perform its intended function and without interfering with normal maintenance procedures in the computer using the program.

Various methods and apparatus for enciphering and deciphering digital data for security purposes have been devised in the past as disclosed in U.S. Pat. No. 3,868,631, which was issued on Feb. 25, 1975, for a "DIGITAL CRYPTOGRAPHIC SYSTEM AND METHOD;" in U.S. Pat. No. 3,958,081, which was issued on May 18, 1976, for a "BLOCK CIPHER SYSTEM FOR DATA SECURITY;" in U.S. Pat. No. 2,981,794, which was issued on Apr. 25, 1961, for a "TELEPRINTER SECRECY SYSTEM;" and in U.S. Pat. No. 3,950,616, which was issued on Apr. 13, 1976, for "ALIGNMENT OF BYTES IN A DIGITAL DATA BIT STREAM." However, these past cryptographic systems are designed to protect digital data in transit from one point to another against being intercepted in transit by an outside party and do not prevent the data from being reproduced by the lawful user of the device at the receiving end of the data transmission link. Accordingly, these prior art cryptographic systems do not solve the problem to which this invention is addressed.

SUMMARY OF THE INVENTION

In accordance with this invention, the above-noted problem is solved by scrambling the data address portions of the program instructions in accordance with a predetermined cipher key, storing the data in a separate data memory at the addresses specified in the original unscrambled program, storing the instructions with the scrambled data addresses in an instruction memory at addresses which correspond to the original program sequence so that the program steps can be read out in their original sequence, coupling an unscrambler which operates in accordance with the cipher key in series with the data memory address input conductors, and providing means to prevent the user from examining the ciphered portion of the unscrambler or from electrically interrogating the unscrambler in such a manner as to determine the cipher key.

BRIEF DESCRIPTION OF THE DRAWINGS

FIG. 1 is a block diagram of the preferred embodiment of the invention;

FIG. 2 is a flow chart of a simple scrambler program which can be used in the embodiment of FIG. 1;

FIG. 4 is a plan view of an unscrambler for the scrambled program illustrated in FIG. 2.

DESCRIPTION OF THE PREFERRED EMBODIMENT

Figure 3:
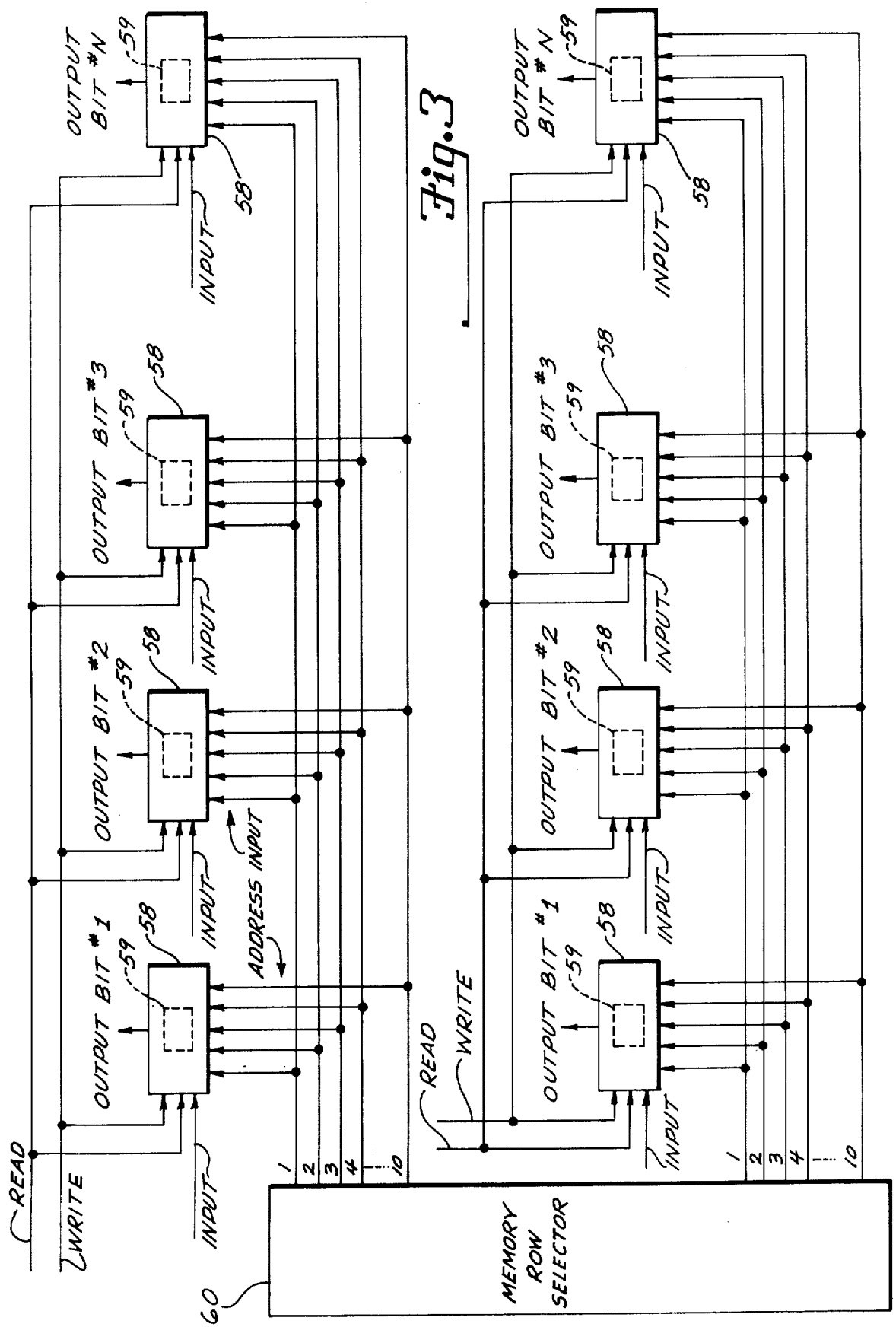
FIG. 3 is a block diagram of a portion of a semiconductor data memory.

Referring to FIG. 1, the preferred embodiment has separate instruction and data memories to enable the data addresses to be scrambled without scrambling the program sequence. In this particular example, instruction memory 10 and data memory 12 are both random access memories (RAM), although in other examples, either or both memories could be read-only memories (ROM) or programmable read-only memories (PROM).

Instruction memory 10 receives address inputs from a program counter 14 which is incremented by pulses from a conventional central processing unit 16 and applies its instruction output words to central processing unit 16. Normal program instructions with unscrambled data addresses have only the data address portions thereof scrambled in accordance with a predetermined cipher key by an assembler or compiler 18 with a scrambler as described hereinafter. Block 18 in FIG. 1 represents a general purpose digital computer which is programmed in accordance with an assembler or compiler that includes a scrambler routine for scrambling the data address portions of the program instructions. The program instructions with the scrambled data address portions are written in instruction memory 10 in the conventional manner at addresses which correspond to the program sequence and the data is written into data memory 12 at the original unscrambled addresses therefor. An example of a typical portion of unscrambled program instructions using the Interdata Model 70 instruction set is given in Chart I below:

CHART I
UNSCRAMBLED PROGRAM INSTRUCTIONS

| INSTRUCTION MEMORY LOCATION | INSTRUCTION | MNEMONIC | COMMENT |
|---|---|---|---|
| 0100 | 4810 | LH R1, DATA1 | LOAD register #1 with the contents of Data Location DATA1 |
| 0102 | 0100* | | |
| 0104 | 4A10 | AH R1, DATA2 | ADD to Register #1 the contents of Data Location DATA2 |
| 0106 | 0200* | | |
| 0108 | C510 | CLHI R1, 16 | COMPARE Register #1 to 16 |
| 010A | 0010 | | |
| 010C | 4230 | BE MATCH | BRANCH to Label MATCH in INSTRUCTION MEMORY if equal |
| 010E | 1000 | | |
| 0110 | 4010 | STH R1, SAVE | STORE Register #1 in the DATA MEMORY at Data Location SAVE |
| 0112 | 0101* | | |
| 0114 | 4300 | B DONE | BRANCH to Label DONE in INSTRUCTION MEMORY |
| 0116 | 2000 | | |

*These instructions reference DATA MEMORY addresses.

In this particular example, the memory locations and instructions are expressed in the hexadecimal code although it will be understood by those skilled in the art that other codes could be used in other examples. Four hexadecimal digits (16 binary bits) are used to specify each memory location or data address and four hexadecimal digits are used to express each instruction. The instructions shown in Chart I are for adding two numbers located at the specified addresses in data memory 12, comparing the result of the addition to a predetermined constant stored in instruction memory 10, and then branching if the compared numbers are equal or storing the result in data memory 12 if they are unequal.

There are two steps for each instruction, the first step (e.g. instruction memory location 0100) expresses what is to be done, and the second step (e.g. instruction memory location 0102) expresses the address of the data referred to in the instruction or expresses the data itself if such data is stored in instruction memory 10. The instruction 4810 stored at instruction memory location 0100 means to load register #1 (in CPU 16, see FIG. 1) with the contents of the data location stored in the next instruction memory location 0102. Thus the number stored at instruction memory location 0102 is a data address as are the numbers stored at instruction memory locations 0106 and 0112. These are the only portions of the program which are scrambled.

The next instruction expressed by the numbers stored at instruction memory locations 0104 and 0106 are to add the contents of data location 0200 to register #1. Following this, the instruction expressed by the numbers stored at instruction memory locations 0108 and 010A is to compare the contents of register #1 to the constant 0010. Note that the constant 0010, which is stored at instruction memory location 010A, is not a data address as are the numbers stored at instruction memory location 0102, 0106, and 0112. Only the data addresses are scrambled in this embodiment of the invention.

Chart II shows the program instructions of Chart I with the data address portions thereof scrambled in accordance with a relatively simple cipher key wherein the least significant 10 bits of the data address number are rotated by one bit counterclockwise, i.e., bits #2 through #10 are each shifted one bit to the right and bit #10 is replaced by bit #1.

CHART II
SCRAMBLED PROGRAM INSTRUCTIONS

| INSTRUCTION MEMORY LOCATION | INSTRUCTION | MNEMONIC | COMMENT |
|---|---|---|---|
| 0100 | 4810 | LH R1, DATA1 | Same Comments as Chart I. |
| 0102 | 0080* | | |
| 0104 | 4A10 | AH R1, DATA2 | |
| 0106 | 0100* | | |
| 0108 | C510 | CLHI R1, 16 | |
| 010A | 0010 | | |
| 010C | 4230 | BE MATCH | |
| 010E | 1000 | | |
| 0110 | 4010 | STH R1, SAVE | |
| 0112 | 0280* | | |
| 0114 | 4300 | B DONE | |
| 0116 | 2000 | | |

*These DATA MEMORY addresses have been scrambled by rotating the least significant 10 bits one bit counterclockwise.

The program with the scrambled data address portions, as exemplified by the instructions shown in Chart II, is written in instruction memory 10, but the data which is written in data memory 12 is written at the original unscrambled data addresses as shown in Chart I. Therefore, in order for the program to function properly, the scrambled data address output of instruction memory 10 is unscrambled by an unscrambler 20 (FIG. 1) which is coupled in series with the address input conductors 22 of data memory 12. And, in order to prevent the computer user from examining unscrambler 20 or electrically interrogating it to determine its cipher key, it is preferably integrated with data memory 12 and encapsulated therewith to prevent inspection or electrical access to the data address input conductors 22 as described hereinafter.

FIG. 2 is a flow chart of a program for scrambling the data address portions of the instruction signals in accordance with the above noted simple cipher key. The instructions listed in Charts I and II are portions of the Interdata Model 70 instruction set which also includes short format instructions, immediate format instructions, branch instructions, and shift/rotate instructions, none of which include data addresses. The instructions which include data addresses are selected by a process of elimination executed on program steps 24-34 (FIG. 2). The short format instructions are eliminated on step 26; the immediate format instructions are eliminated on step 28; the branch instructions are eliminated on step 30; and the shift/rotate instructions are eliminated on step 32. All of the instructions which remain have data address portions which are scrambled in accordance with the above/noted cipher key in step 36 of the program. This simple scrambler program can be inserted at any convenient point in a normal assembler or compiler program.

The unscrambler for the above-noted cipher key is shown in FIG. 4. This consists of 10 conductors 38-56 which are connected between 10 input terminals $I_1$-$I_{10}$ and 10 output terminals $O_1$-$O_{10}$ in such a manner as to reverse the above-noted rotation of the least significant 10 bits of the data address one bit counter clockwise. Conductors 38-56 are coupled in series with the corresponding address input conductors 22 of data memory 12 and are integrated and encapsulated therewith as described hereinafter to prevent anyone from examining conductors 38-56 to determine the cipher key or from electrically interrogating conductors 38-56 in such a manner as to determine the cipher key.

Referring to FIG. 3, in this particular example data memory 12 is a semiconductor RAM made up of a plurality of semiconductor memory units 58 each of which contains a semiconductor chip 59 upon which a semiconductor memory array having 1023 separate bits is formed. There are 10 address input conductors for each memory unit 58 plus a read and write input, a data input and data output, along with the conventional voltage and ground inputs which are not shown in the drawings. Memory units 58 are connected together in a plurality of rows each of which contains N memory units 58 where N is the number of bits in the binary words stored in the memory. The ADDRESS input conductors of each memory unit 58 in the same row are connected in parallel as are the READ and WRITE inputs.

To write information into the memory, the desired memory unit row is selected by conventional selector circuits 60, which respond to the most significant six bits of the data memory address numbers shown in Charts I and II. This portion of the data memory address is not scrambled. The least significant 10 bits, which are scrambled, are applied to the address inputs of all of the memory units 58 in the selected memory row. The data which is to be written into each memory unit 58 is applied to the corresponding data input. The common WRITE input is then energized to write the information into the selected memory units 58 at the addressed memory location. To read information out of the memory, the desired memory location is addressed as described above and the common READ input is energized.

In the above-described semiconductor memory, the unscrambler shown in FIG. 4 is preferably included in the conductors on the semiconductor chip 59 of each memory unit 58 and is encapsulated with a material which is opaque to prevent inspection of the conductors on the semiconductor chip and which is strong enough to insure that the microscopic conductors on the chip 59 will be dismembered beyond recognition if the encapsulating material is removed from the chip 59 by force.

When the chip 59 is encapsulated it is impossible to examine the conductors thereon to determine the cipher key and it is impossible to electrically interrogate the unscrambler in such a manner as to determine the cipher key. If an attempt is made to remove the encapsulating material to expose the scrambled conductors, the scrambled conductors, which are microscopic in thickness, will be dismembered beyond recognition when the encapsulating material is removed. Thus the combination of forming the unscrambler on the semiconductor chip 59 and encapsulating the chip 59 prevents anyone from determining the cipher key by examining or electrically interrogating the unscrambler. The unscrambler cannot be interrogated electrically to determine the cipher key because although the input conductors of the unscrambler are available for interrogation the output conductors thereof are hidden under the encapsulating material and cannot be accessed to complete the interrogation.

Although the above-described cipher key is relatively simple, it serves the purpose of disguising the program stored in instruction memory 10 and preventing anyone from reproducing the program with the information available in memories 10 and 12. For example, if the instruction expressed at locations 0100 and 0102 in the instruction memory are read out and interpreted in accordance with the pertinent instruction set they will signify "Load register #1 with the contents of data location 0080." This, however, is incorrect and misleading because the data address 0080 has been scrambled and really means data location 0100. All of the data addresses in instruction memory 10 are similarly scrambled and therefore the information in instruction memory 10 is useless for purposes of reproducing the original program without the scrambler cipher key. but the program can be run on the computer without any problems because all data addresses are unscrambeled at the address inputs of data memory 12 by the unscramblers thereon. Also, normal maintenance operations can be performed on the computer since the instructions conform to the pertinent instruction set and the program sequence is unscrambled.

Although a simple cipher key is utilized in the foregoing example, more complicated cipher keys can be used which require binary decoding matrices as unscramblers since decoding matrices can also be formed on semiconductor chips along with semiconductor memories. Also, other methods can be employed to prevent unscrambler 20 from being examined or electrically interrogated so as to determine the cipher key.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. In a computer system including means for generating a sequence of instruction signals which represent program instructions for performing designated computer operations, some instruction signals having data address portions which represent the addresses at which data involved in the corresponding operations is stored, said instruction signals being stored in memory means in said computer system, the improvement for disguising said program instructions comprising:

a data memory in said memory means, said data memory having address input conductors and data output conductors;

means for storing in said data memory data signals representing quantities referred to in said program instructions at the addresses specified in said data address portions of said instruction signals;

scrambler means for scrambling the data address portions of said instruction signals in accordance with a predetermined cipher key;

an instruction memory in said memory means;

means for storing said instruction signals including those with scrambled data address portions in said instruction memory;

means for reading said instruction signals out of said instruction memory;

an unscrambler coupled in series with said data memory address conductors, said unscrambler being operable in accordance with said cipher key to unscramble any scrambled data address signals applied to the input thereof and to apply the unscrambled data address signals to said data memory address conductors;

means for applying said scrambled data address signals read out of said instruction memory to the input of said unscrambler; and means for reading data out of said data memory at said unscrambled addresses in accordance with said program instructions for use in the corresponding computer operations.

2. The computer system defined in claim 1 and also comprising means for preventing anyone from examining the ciphered portion of said unscrambler to determine said cipher key or from electrically interrogating said unscrambler in such a manner as to determine said cipher key.

3. The computer system defined in claim 1 wherein said data memory comprises a plurality of semiconductor memory units each containing a semiconductor memory chip having address input conductors and data output conductors, and further comprising a plurality of unscramblers each coupled in series with the data memory address conductors of a corresponding memory chip, each unscrambler being operable in accordance with said cipher key to unscramble any scrambled data address signals applied to the input thereof and to apply the unscrambled data address signals to the corresponding memory chip.

4. The computer system defined in claim 3 wherein each unscrambler is mounted on the corresponding memory chip and is encapsulated therewith.

5. The computer system defined in claim 1 wherein said cipher key comprises rotating at least a portion of the binary bits representing each data address in a predetermined direction.

6. The computer system defined in claim 5 wherein said unscrambler comprises a plurality of conductors, one for each data address input conductors, which are connected thereto in such manner as to rotate said binary bits opposite to said predetermined direction to unscramble the scrambled addresses.

7. The computer system defined in claim 6 wherein said data memory comprises a plurality of semiconductor memory units each containing a semiconductor memory chip having address input conductors and data output conductors, and further comprising a plurality of unscramblers each coupled in series with the data memory address conductors of a corresponding memory chip and each being operable in accordance with said cipher key to unscramble any scrambled data address signals applied to the input thereof and to apply the unscrambled data address signals to the corresponding memory chip, and wherein the conductors of each unscrambler are mounted on a corresponding memory chip and are encapsulated therewith.

8. A method of disguising a computer program which is to be stored in first and second memories and which comprises a sequence of instruction signals to be stored in said first memory, said instruction signals representing program instructions for performing designated computer operations, some instruction signals having data address portions which represent the addresses at which data signals involved in the corresponding operation are to be stored in said second memory, said method comprising the steps of:

(A) storing said data signals in said second memory at the locations specified by said data address portions of said instruction signals;

(B) scrambling said data address portions of said instruction signals in accordance with a predetermined cipher key before said instruction signals are stored in said first memory;

(C) storing said instruction signals including said scrambled data address portions thereof in said first memory;

(D) reading said instruction signals out of said first memory;

(E) unscrambling each scrambled data address portion of the instruction signals read out of said first memory before the corresponding data signals are read out of said second memory; and (F) reading said data signals specified by the unscrambled data address portion of said instruction signals out of said second memory for use in the corresponding computer operations.

9. The method according to claim 8 wherein each scrambled data address portion of an instruction signal is unscrambled while it is being read out of said first memory.

* * * * *